April 14, 1953  E. K. KARLSSON  2,634,731
CORN PICKING AND SNAPPING ROLLS
Filed Nov. 16, 1949
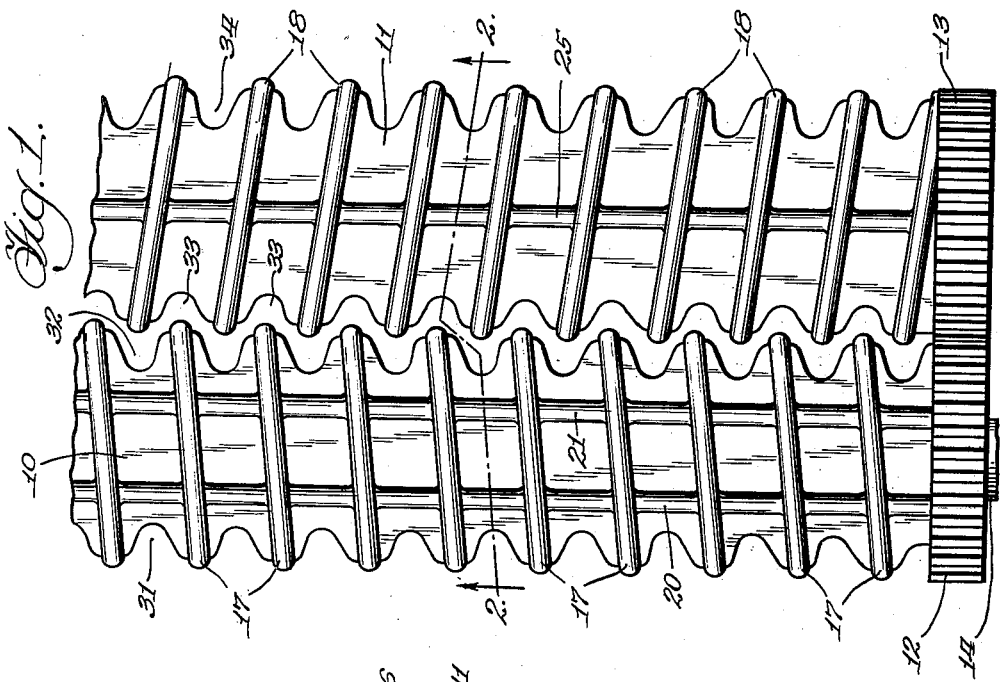
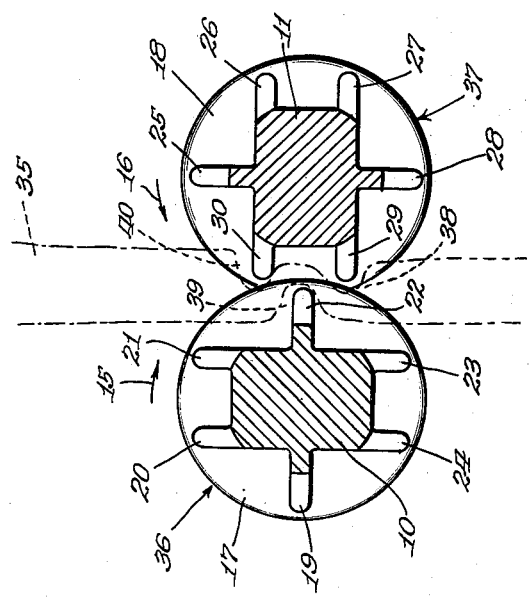
Inventor:
Elof K. Karlsson
Atty.

Patented Apr. 14, 1953

2,634,731

UNITED STATES PATENT OFFICE 2,634,731

CORN PICKING AND SNAPPING ROLLS

Elof K. Karlsson, Moline, Ill., assignor to International Harvester Company, a corporation of New Jersey Application November 16, 1949, Serial No. 127,598

2 Claims. (Cl. 130—5)

This invention relates to new and improved corn picking and snapping rolls.

Corn picking and snapping rolls must perform several functions. The rolls must positively grip stalks as they stand in the field and convey the stalks rearwardly of the machine. Another function of snapping rolls is to feed gripped stalks downwardly therethrough, and finally, the rolls must be capable of stripping or snapping an ear of corn from the stalk as the stalk is pulled downwardly therebetween.

A principal object of this invention is, therefore, to provide cooperative corn picking and snapping rolls which simultaneously convey stalks rearwardly of the machine downwardly between the rolls, and finally snap ears of corn from the stalks.

An important object of this invention is the provision of cooperative snapping rolls having intermeshing helical ribs to effect a rearward feeding of the stalks between adjacent rolls.

Another important object of this invention is to supply corn picking rolls having helical ribs with longitudinally extending lugs arranged and constructed to permit intermeshing of the helical ribs and to effect aggressive downward feeding of the stalks between the rolls without breaking the stalks prior to snapping of the ears therefrom.

A further important object of this invention is to provide mating corn picking rolls having longitudinally extending lugs disposed 90° apart around the periphery of the rolls and arranged alternately single and double, and the rolls driven in timed relationship so that a single lug of one roll meshes between the double lugs of the mating roll.

Other and further important objects of this invention will become apparent from the disclosures in the following specification and accompanying drawing in which:

Fig. 1 is a top plan view of the cooperative corn picking and snapping rolls of this invention.

Fig. 2 is a sectional view taken on the line 2—2 of Fig. 1.

As shown in the drawing, the reference numeral 10 indicates generally the core of a longitudinally extending corn picking and snapping roll and numeral 11 indicates the core of an adjacent or cooperative longitudinally extending snapping roll. The ends of the roll cores 10 and 11 are provided with spur gears 12 and 13 which mesh with each other as shown in Fig. 1. A shaft 14 is shown projecting laterally beyond the end of the spur gear 12 to provide means for imparting driving rotation to the rolls. It should be understood that as the spur gear 12 is driven in one direction of rotation the spur gear 13 will be driven in the opposite direction of rotation. As shown in Fig. 2 the rolls are driven inwardly toward each other as indicated by the directional arrows 15 and 16.

Each of the roll cores 10 and 11 is provided with a helical rib 17 and 18 formed integrally therewith and extending over the full length of the rolls. The paths of the helical ribs 17 and 18 are longitudinally offset from each other permitting the ribs to intermesh, or in other words, overlap with respect to the rib of the opposite or adjacent roll.

The roll cores 10 and 11 are also equipped with longitudinally extending lugs which, as shown in Fig. 2, are designated by the numerals 19, 20, 21, 22, 23 and 24 on the roll core 10, and are designated by the numerals 25, 26, 27, 28, 29 and 30 on the roll core 11. It will be noted that the lugs 19 to 24 inclusive are disposed at right angles or positioned 90° apart around the periphery of the roll core 10, and similarly the lugs 25 through 30 are also placed at right angles to each other and disposed in the same manner around the periphery of the roll core 11. The lugs 19 through 30 are arranged alternately single and double and as shown in Fig. 2 the single lug 22 of the roll core 10 is mating centrally between the spaced double lugs 29 and 30 of the roll core 11. Similarly, upon rotation of the rolls inwardly toward each other in the direction indicated by the arrows 15 and 16 the single lug 25 of the roll core 11 will mesh centrally between the spaced double lugs 20 and 21 of the roll core 10.

The outer surfaces of each of the longitudinally extending lugs 19 through 30 are indented or cut out as more particularly shown in Fig. 1 at 31, 32, 33 and 34 to permit the helical rib which is of slightly greater height than the lugs to intermesh with the rib of the adjacent roll. The space provided between the outer edge of one helical rib and the indented or cut out portion of the opposing lug members will permit reception of a stalk of corn and by reason of the helical winding of the ribs 17 and 18, which are opposite in pitch and direction, will cause feeding of the stalk longitudinally between the cooperative rolls.

Although the lugs 19 through 30 are continuous throughout the length of the rolls they are divided by adjacent convolutions of the respective helical ribs 17 and 18. As shown in Fig. 2, when the machine is in operation, a stalk of corn 35 is shown in dashed lines to indicate the positioning of the stalk with respect to the cooperative corn picking and snapping rolls 36 and 37 and to show how the interengaging lug members 22, 29 and 30 bite into the stalk to cause a downward feeding thereof without breaking or severing the stalk at any time. The lug 29 makes the first bite into the stalk 35 as shown at 38 whereupon the lug 22 of the roll 36 makes a second bite in the stalk 35 as shown at 39 and spaced above the bite 38 on the opposite side of the stalk. Similarly, the lug 30 engages the stalk 35 forming an indentation or bite as shown at 40 which is in alignment with the bite 38 and spaced thereabove and opposite the bite 39 and also spaced thereabove. At no time do opposing lugs of the rolls 36 and 37 directly strike the centrally disposed stalk 35 at the same time, thus eliminating breaking of the stalk and the losing of a grip on the stalk prior to the time when the ear of corn is stripped therefrom. Thus the rolls 36 and 37 are very aggressive in simultaneously feeding the stalk rearwardly and downwardly and yet the rolls eliminate the breaking of stalks.

Various details of construction may be varied throughout a wide range without departing from the invention disclosed herein and I therefore do not propose limiting the patent granted hereon otherwise than as necessitated by the appended claims.

What is claimed is:

1. Cooperative corn picking and snapping rolls comprising coaxially extending adjacent rolls, a spur gear on the end of each of said rolls, said spur gears meshing directly with each other whereby when one of the rolls is driven in one direction the other roll is rotatably driven in the other direction, a helical rib formed on each of said rolls, said helical rib paths offset longitudinally from each other, said helical ribs being of a height to overlap the helical ribs of the adjacent rolls, whereby the helical ribs of the adjacent rolls intermesh, longitudinally extending lugs formed on said rolls and positioned between and filling the space between adjacent convolutions of the helical ribs, said longitudinally extending lugs having their outer surfaces indented to permit intermeshing of the helical ribs of the adjacent rolls therein, and said longitudinally extending lugs disposed at 90° apart around the periphery of the rolls and said lugs of the adjacent rolls being offset laterally from each other when they are lying at a straight angle relative to each other.

2. Cooperative corn picking and snapping rolls as set forth in claim 1 in which the longitudinally extending laterally offset lugs are alternately single and double and the rolls arranged and constructed so a single lug registers centrally between double lugs whereby the rolls are desirably aggressive in corn stalk feeding with little likelihood of breaking the stalks.

ELOF K. KARLSSON.

References Cited in the file of this patent

UNITED STATES PATENTS

| Number | Name | Date |
|---|---|---|
| 135,840 | Philip | Feb. 11, 1873 |
| 196,400 | Terman | Oct. 23, 1877 |
| 422,932 | Galt et al. | Mar. 11, 1890 |
| 914,465 | Stone | Mar. 9, 1909 |
| 1,077,963 | Baird | Nov. 4, 1913 |
| 1,827,216 | Synck | Oct. 13, 1931 |
| 2,315,950 | Fitzloff | Apr. 6, 1943 |

OTHER REFERENCES

"Dearborn-Wood Bros. Corn Picker (Model 16–4)," copyright, 1948, by Dearborn Motors Corporation, Detroit 3, Michigan. Pages 37 and 40 relied upon.